Oct. 2, 1923.

P. J. MESSER 1,469,481

VEHICLE SIGNAL

Filed Nov. 7, 1919

2 Sheets-Sheet 1

WITNESSES
J. Herbert Bradley.

INVENTOR
Peter J. Messer
By Jno. S. Green
His Atty.

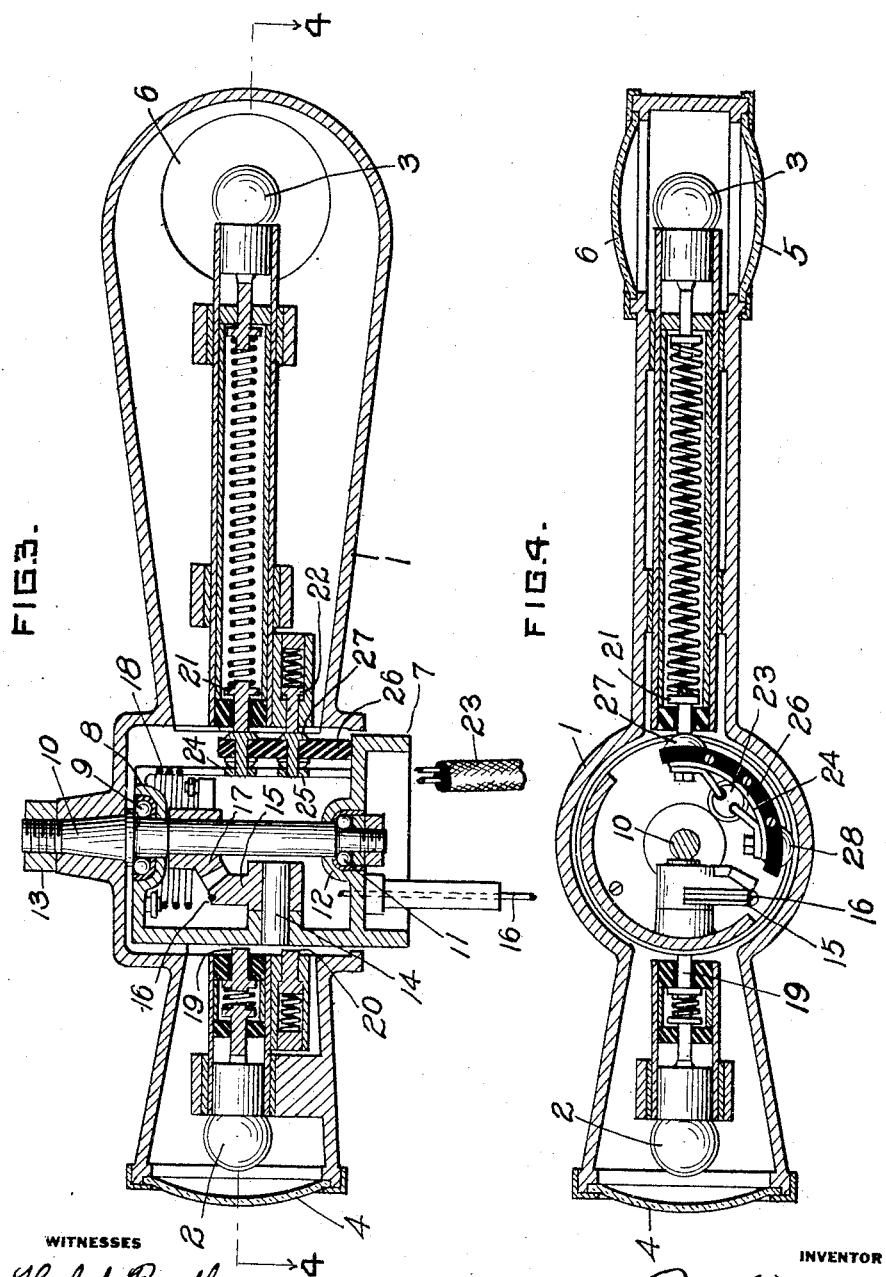

Patented Oct. 2, 1923.

1,469,481

UNITED STATES PATENT OFFICE.

PETER J. MESSER, OF OLEAN, NEW YORK.

VEHICLE SIGNAL.

Application filed November 7, 1919. Serial No. 336,499.

*To all whom it may concern:*

Be it known that I, PETER J. MESSER, a citizen of the United States, and a resident of Olean, in the county of Cattaraugus and State of New York, have made a new and useful Improvement in Vehicle Signals, of which the following is a specification.

My invention relates to motor vehicles and consists of a pilot light and signal device to be located on the machine, preferably on the side of the cowl of a passenger car or the cab of a truck, but elsewhere if desired.

The main object of my invention is to provide means for the driver of a machine to signal approaching or following vehicles to indicate his intention of turning to right or left or to stop. Minor objects are to make such a device an attractive ornament to a car rather than a clumsy appendage; to provide simple means for operating such a signal from the steering column; to provide means for making and breaking electric lamp contacts in the signal when it is operated at night, and to increase the effectiveness of the device at night time by causing a signal light to supersede temporarily the regular side pilot light.

Figure 2:
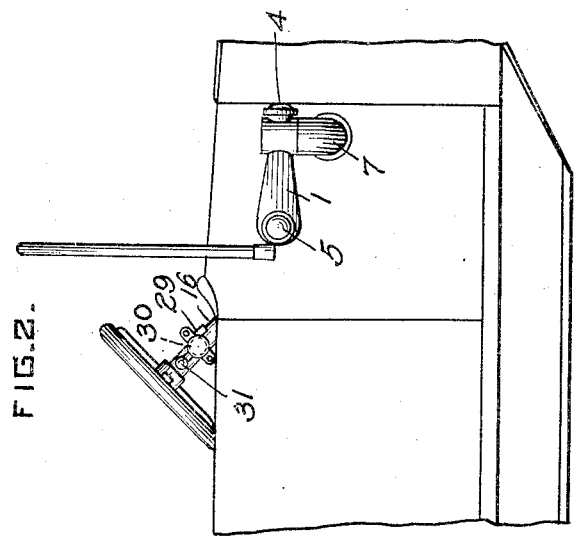
Figure 1:
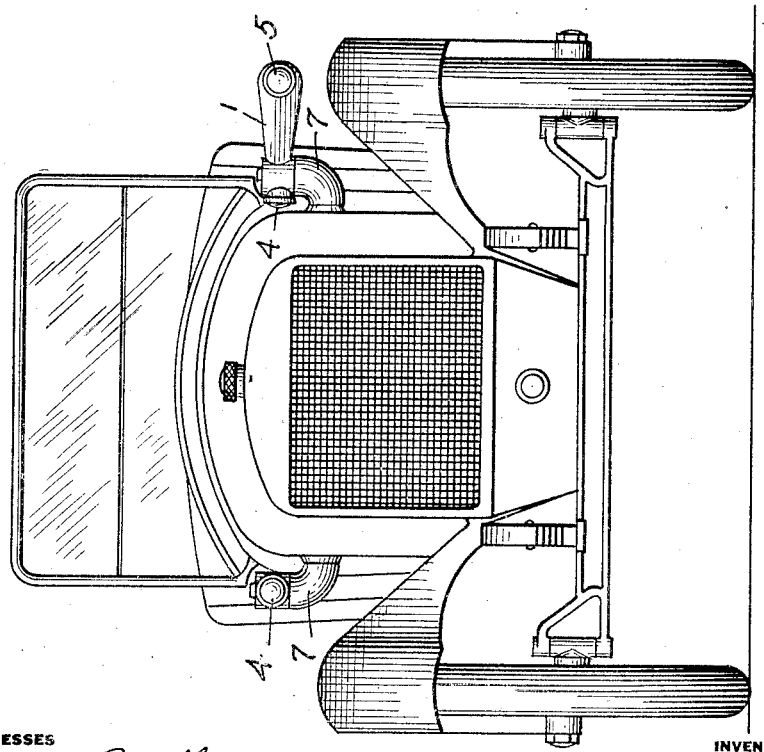

I secure these objects by means of the device described below and shown in the accompanying drawings in which Figure 1 is a front elevation of a passenger automobile equipped with my device and having one of the signals in operative position and the other presenting the usual pilot lamp appearance; Fig. 2 is a partial view of the side of the car with the signal on that side inoperative and showing one of the operating handles on the steering column; Fig. 3 is an enlarged, vertical, longitudinal section thru one of the signals and Fig. 4 is a horizontal section on line 4—4 of Fig. 3.

Briefly, my invention consists of an elongated signal body 1 with lamps 2 and 3 at opposite ends respectively, a lens 4 in one end and a pair of lenses 5 and 6 in the opposite sides near the other end. The body 1 is pivotally mounted near one end on a suitable bracket 7 and adapted, when in its normal position, to be parallel to the side of the car and to present end lens 4 to the front of the car, or the driver may swing body 1 to a position at right angles to the side of the car and present the side lenses 5 and 6 to the view of those before or behind the car respectively.

The upper end of bracket 7 is provided with a cup 8 for ball bearings 9 which support a vertical spindle 10. The latter extends downwardly to a second set of ball bearings 11 nested in a cup 12 on bracket 7. The signal body 1 is supported on spindle 10 and clamped thereto by a nut 13. A horizontal shaft 14 is mounted on the inside of bracket 7 and journaled thereon is a vertical, bevel gear quadrant 15. Lying in a circumferential groove in quadrant 15 and secured to the latter is a Bowden cable wire 16 which, when pulled, rotates quadrant 15 and a meshed, horizontal quadrant 17 fixedly mounted on spindle 10, thus rotating spindle 10 and body 1. A coiled spring 18 is secured under tension to quadrant 17 and bracket 7 and returns body 1 to its normal position when the pull on the cable wire is released.

The upper part of bracket 7 divides body 1 into two chambers, one long and one short. Lens 4 is fitted in the end of the short chamber and lamp 2 is mounted within the chamber adjacent the lens. The current conductors to the lamp terminate in spring supported contacts 19 and 20. Lenses 5 and 6 are fitted on the opposite, vertical sides of the longer chamber and near the end thereof and are preferably of red glass. Lamp 3 is mounted between them and its conductors terminate in spring supported contacts 21 and 22.

A two wire cable 23 leads from the car lighting system and the outer ends of its wires are secured to terminal plates 24 and 25 respectively which are mounted upon an insulator 26. Buttons 27 extend thru insulator 26 and connect plates 24 and 25 with contacts 21 and 22 respectively. Buttons 28 similarly connect the plate with contacts 19 and 20 when body 1 is rotated ninety degrees from the position shown.

Bowden cable 16 extends thru the side of the car to a convenient point on the steering column where it is secured to an operating fixture 29. The end of the cable wire is secured to a sheave 30 and the latter is operated by a lever 31. As lever 31 is turned downward, the wire in cable 16 rotates quadrants 15 and 17 and the longer chamber in body 1 moves to signaling position, namely at right angles to the car. In day time the extended arm, especially with red lenses, will be sufficient indicator; at night the lamp circuit is switched on and the device normally provides a side pilot light for the vehicle but when the driver wishes to signal, a red light is substituted therefor.

Among other advantages, my device does not incumber the dash or windshield and is operated on an inclosed car as easily as on an open one and without requiring the driver to change his position. Bracket 7 may be projected from the side of the car in any attractive form or the bracket may be adapted to be applied as an accessory to old cars or cars manufactured with reference to a built in signal.

I claim:—

1. An automobile signalling device, comprising a bracket mounted on the frame of the automobile, an elongated body pivotally mounted on said bracket at a point intermediate its ends and partially enclosing said bracket, a spindle secured to said body and rotatively mounted on said bracket, a beveled gear segment rigidly secured to said spindle, a beveled second gear segment meshing therewith and journaled on said bracket, a coiled spring between said bracket and said first mentioned gear segment, for moving said body to normal position, two sets of electrical terminals mounted on said bracket in spaced relation, a separate lamp bulb located in each end of said body, spring pressed terminals electrically connected to said bulbs, and movable with said body into and out of contact with one or the other of said sets of terminals, and means for rotating said second gear segment to rotate said body.

2. In combination with the frame of an automobile, a vertically projecting bracket, an elongated body pivotally mounted on said bracket at a point intermediate its ends and enclosing the upper end of said bracket, a vertical spindle secured to said body and rotatively mounted on said bracket for rotatively securing said body to said bracket, a beveled gear segment journaled on said bracket within the enclosure of said body, a beveled gear segment rigidly mounted on said spindle within the enclosure of said body and meshing with said first mentioned gear segment, a coiled spring between said bracket and said last mentioned gear segment for yieldingly holding said body in normal position, means for rotating said first mentioned gear segment to rotate said body about its pivot, a separate lamp bulb located in each end of said body, a separate spring pressed terminal electrically connected to each lamp bulb, spaced terminals fixedly mounted on the bracket each adapted to be engaged and disengaged by one of the body terminals during the movement of the body, said terminals being located in the enclosure of said body.

In testimony whereof, I have hereunto subscribed my hand this 30th day of Oct., 1919.

PETER J. MESSER.